(12) United States Patent
Kim et al.

(10) Patent No.: US 9,656,907 B2
(45) Date of Patent: May 23, 2017

(54) LOW EXPANSION GLASS FILLER, METHOD OF MANUFACTURING THE SAME AND GLASS FRIT INCLUDING THE SAME

(71) Applicant: Samsung Corning Precision Materials Co., Ltd., Gyeongsangbuk-do (KR)

(72) Inventors: Jhee-Mann Kim, ChungCheongNam-Do (KR); Kiyeon Lee, ChungCheongNam-Do (KR); Jaemin Cha, ChungCheongNam-Do (KR); Jaeho Lee, ChungCheongNam-Do (KR)

(73) Assignee: Corning Precision Materials Co., Ltd. (KR)

( * ) Notice: Subject to any disclaimer, the term of this patent is extended or adjusted under 35 U.S.C. 154(b) by 120 days.

(21) Appl. No.: 14/058,415

(22) Filed: Oct. 21, 2013

(65) Prior Publication Data
US 2014/0113134 A1   Apr. 24, 2014

(30) Foreign Application Priority Data
Oct. 23, 2012  (KR) .................. 10-2012-0117951

(51) Int. Cl.
| | | |
|---|---|---|
| C03C 3/04 | (2006.01) | |
| C03C 8/16 | (2006.01) | |
| C03C 12/00 | (2006.01) | |
| C03C 8/14 | (2006.01) | |
| C03C 3/064 | (2006.01) | |
| C03C 3/062 | (2006.01) | |
| C03C 3/066 | (2006.01) | |
| C03C 3/091 | (2006.01) | |
| C03C 3/21 | (2006.01) | |
| C03C 8/02 | (2006.01) | |
| C03C 8/04 | (2006.01) | |

(Continued)

(52) U.S. Cl.
CPC .............. *C03C 8/16* (2013.01); *C03C 3/062* (2013.01); *C03C 3/064* (2013.01); *C03C 3/066* (2013.01); *C03C 3/091* (2013.01); *C03C 3/21* (2013.01); *C03C 8/02* (2013.01); *C03C 8/04* (2013.01); *C03C 8/08* (2013.01); *C03C 8/14* (2013.01); *C03C 8/22* (2013.01); *C03C 12/00* (2013.01); *C03C 17/04* (2013.01); *Y10T 428/2982* (2015.01)

(58) Field of Classification Search
CPC  C03C 3/04; C03C 3/062; C03C 3/064; C03C 4/0071; C03C 10/0054
USPC ......... 501/21, 41, 45–49, 53, 55, 66, 68, 70, 501/72–75, 77
See application file for complete search history.

(56) References Cited

U.S. PATENT DOCUMENTS 3,531,271 A * 9/1970 Dumbaugh, Jr. .............. 65/32.5
4,421,699 A * 12/1983 Inoguchi et al. .............. 264/639
(Continued)

*Primary Examiner* — Holly Le
(74) *Attorney, Agent, or Firm* — Lerner, David, Littenberg, Krumholz & Mentlik, LLP

(57) ABSTRACT

A low expansion glass filler which minimizes reflection of laser light during hermetic sealing, a method of manufacturing the same and a glass frit including the same. The low expansion glass filler includes $SiO_2$, $Al_2O_3$, $B_2O_3$ and $CaCO_3$, the transmittance of the low expansion glass filler being 80% or greater at a wavelength ranging from 630 to 920 nm.

9 Claims, 2 Drawing Sheets

(51) Int. Cl.
  *C03C 8/08* (2006.01)
  *C03C 8/22* (2006.01)
  *C03C 17/04* (2006.01)

(56) References Cited

U.S. PATENT DOCUMENTS

| | | | |
|---|---|---|---|
| 6,284,186 B1* | 9/2001 | Hansen | 264/523 |
| 6,924,246 B2* | 8/2005 | Kato et al. | 501/16 |
| 2003/0232713 A1* | 12/2003 | Beall et al. | 501/125 |
| 2004/0050106 A1* | 3/2004 | Murnane | C03C 1/026 65/134.3 |
| 2005/0113241 A1* | 5/2005 | Yamamoto | C03C 3/066 501/67 |
| 2007/0042890 A1* | 2/2007 | Hemmings et al. | 501/11 |
| 2009/0064717 A1* | 3/2009 | Son | C03C 8/04 65/42 |
| 2009/0075805 A1* | 3/2009 | Kurachi et al. | 501/59 |
| 2009/0136766 A1* | 5/2009 | Son | C03C 8/08 428/432 |
| 2010/0118912 A1* | 5/2010 | Lai | G01N 25/72 374/5 |
| 2012/0202030 A1* | 8/2012 | Kondo | B32B 17/06 428/215 |
| 2013/0333748 A1* | 12/2013 | Naito | C03C 3/21 136/252 |

* cited by examiner

FIG. 2
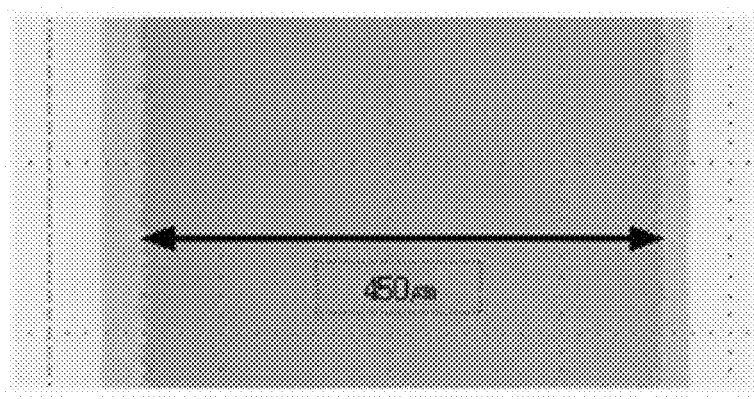
Example 1
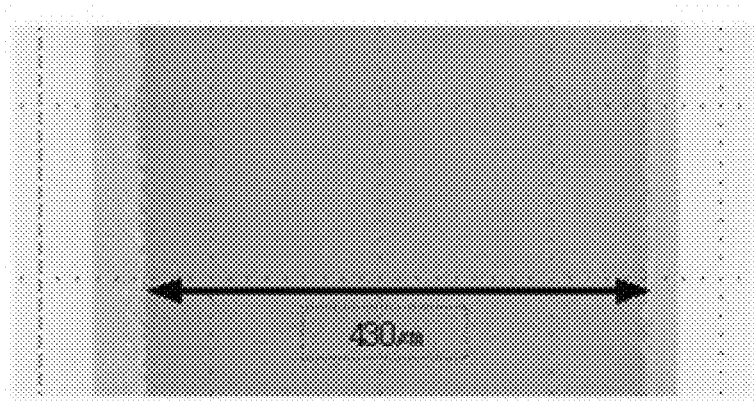
Example 3
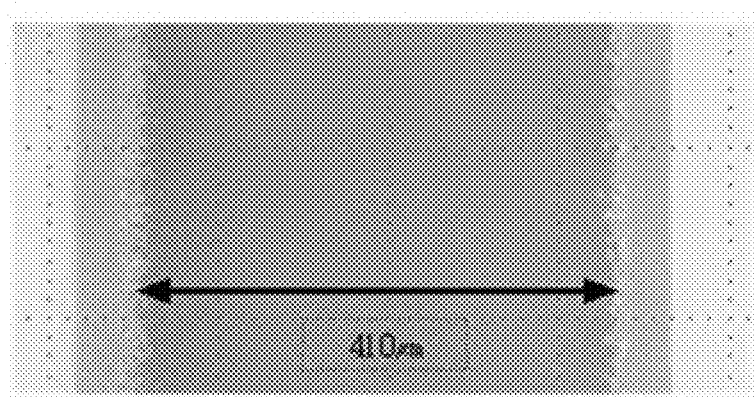
Example 4

LOW EXPANSION GLASS FILLER, METHOD OF MANUFACTURING THE SAME AND GLASS FRIT INCLUDING THE SAME

CROSS REFERENCE TO RELATED APPLICATION

The present application claims priority from Korean Patent Application Number 10-2012-0117951 filed on Oct. 23, 2012, the entire contents of which are incorporated herein for all purposes by this reference.

BACKGROUND OF THE INVENTION

Field of the Invention

The present invention relates to a low expansion glass filler, a method of manufacturing the same and a glass frit including the same, and more particularly, to a low expansion glass filler with which the coefficient of thermal expansion of a glass frit is adjusted, a method of manufacturing the same and a glass frit including the same.

Description of Related Art

Electronic devices, such as an organic light-emitting diode (OLED), an integrated circuit (IC) ceramics passage, a quartz oscillator, an image display device and a photovoltaic cell, are required to be hermetically sealed to minimize external influences, such as moisture and gas, in order to improve the performance and longevity thereof. In particular, OLEDs are regarded as next-generation display technology due to their advantages, such as a high response speed, a self-heating characteristic that precludes the necessity of a backlight, ability to make it possible to fabricate ultra-thin panels, low power consumption and a wide viewing angle. However, OLEDs also have the drawback of being sensitive to moisture and air. In order to overcome this, the space between the upper and lower glass substrates which protect an OLED device is hermetically sealed using a glass frit.

The glass frit that is used as a sealing material for hermetically sealing electrical devices is manufactured by preparing a frit powder by adding $V_2O_5$ or $Fe_2O_3$ to a glass composition and then mixing a ceramic filler to the frit powder.

Pertaining to such a glass frit, Korean Patent Application Publication No. 10-2010-0084476 by Hitachi discloses a low melting point glass frit that is manufactured by producing glass powder by putting $V_2O_5$, MnO, $Fe_2O_3$ or the like into a glass composition and melting the resultant glass mixture, and then mixing a low expansion ceramic filler to the glass powder. In addition, Korean Patent Application Publication No. 10-2010-0049651 by Yamato discloses a glass frit that is manufactured by mixing a low expansion ceramic filler to $V_2O_5$—BaO—ZnO glass.

The low expansion ceramic filler that is mixed to glass powder is cordierite, eucryptite, $Al_2O_3$, zirconium tungstate phosphate (ZWP) or the like. However, such low expansion ceramic fillers have an opaque white color and reflect part of the laser light that is applied during sealing, which is problematic. Consequently, the glass frit is not sufficiently heated such that the bonding force is reduced. When the laser power is increased in order to overcome this, a panel is damaged, which is problematic.

The information disclosed in the Background of the Invention section is provided only for better understanding of the background of the invention, and should not be taken as an acknowledgment or any form of suggestion that this information forms a prior art that would already be known to a person skilled in the art.

RELATED ART DOCUMENT

Patent Document 1: Korean Patent Application Publication 10-2010-0084476

Patent Document 1: Korean Patent Application Publication 10-2010-0049651

BRIEF SUMMARY OF THE INVENTION

Various aspects of the present invention provide a low expansion glass filler which minimizes reflection of laser light during hermetic sealing, a method of manufacturing the same and a glass frit including the same.

In an aspect of the present invention, provided is a low expansion glass filler that includes $SiO_2$, $Al_2O_3$, $B_2O_3$ and $CaCO_3$, the transmittance of the low expansion glass filler being 80% or greater at a wavelength ranging from 630 to 920 nm.

In another aspect of the present invention, provided is a method of manufacturing a low expansion glass filler. The method includes the following steps of: putting $SiO_2$ 45 to 65 parts by weight, $Al_2O_3$ 10 to 25 parts by weight, $B_2O_3$ 10 to 20 parts by weight and $CaCO_3$ 10 to 20 parts by weight into a melting pot; and melting a mixture of the $SiO_2$, $Al_2O_3$, $B_2O_3$ and $CaCO_3$ put in the melting pot by heating the mixture to a temperature of 1600° C. or higher; and cooling and then crushing the molten mixture.

In a further aspect of the present invention, provided is a glass frit that includes: a low melting point glass powder; and a low expansion glass filler comprising $SiO_2$, $Al_2O_3$, $B_2O_3$ and $CaCO_3$, a transmittance of the low expansion glass filler being 80% or greater at a wavelength ranging from 630 to 920 nm.

According to embodiments of the invention, since the low expansion glass filler is transparent, it is possible to minimize the reflection of laser light by the low expansion glass filler during the process of hermetically sealing the space between glass substrates using laser light, thereby minimizing a loss in the power of the laser light.

It is also possible to perform hermetic sealing with low laser power, thereby minimizing damage in a panel due to high laser power.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

BRIEF DESCRIPTION OF THE DRAWINGS

FIG. 2 is pictures showing seal widths made by glass frits according to examples of the invention.

DETAILED DESCRIPTION OF THE INVENTION

Figure 1:
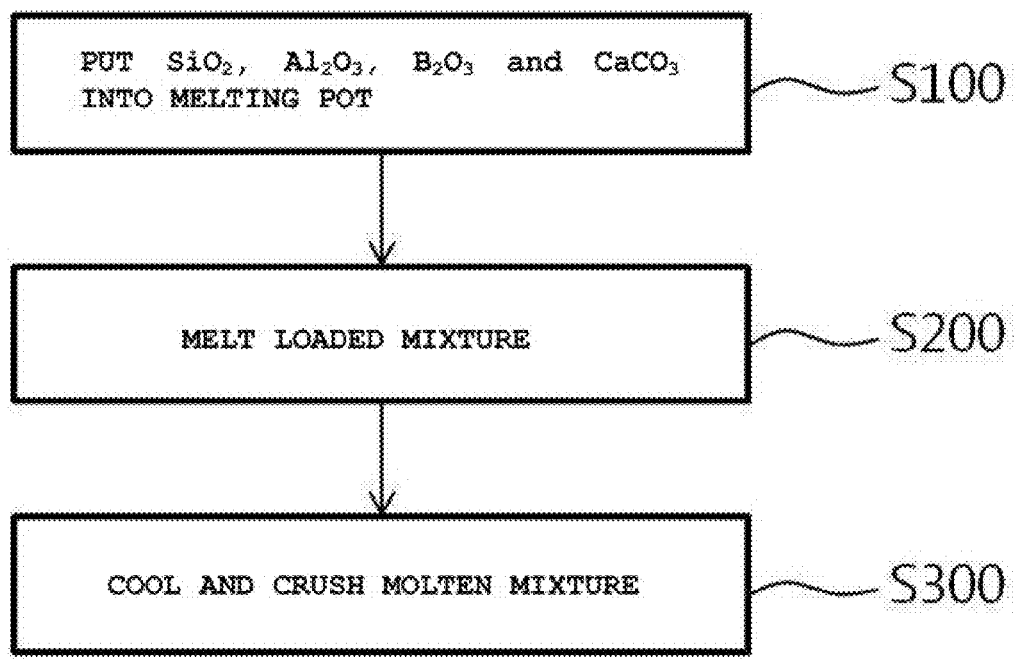
FIG. 1 is a schematic flowchart showing a method of manufacturing a low expansion glass filler according to an embodiment of the invention.

Reference will now be made in detail to a low expansion glass filler, a method of manufacturing the same and a glass frit including the same according to the present invention, embodiments of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

The low expansion glass filler according to an embodiment of the invention is a filler that is mixed into a low melting point glass that is used as a frit powder of a glass frit in order to adjust the coefficient of thermal expansion of the glass frit. The low expansion glass filler contains $SiO_2$, $Al_2O_3$, $B_2O_3$ and $CaCO_3$, with the transmittance thereof being 80% or greater at a wavelength ranging from 630 to 920 nm.

Since the low expansion glass filler contains $Al_2O_3$, $B_2O_3$ and $CaCO_3$, the low expansion glass filler can be colorless and transparent.

Accordingly, an embodiment of the invention provides a low expansion glass filler that contains $Al_2O_3$, $B_2O_3$ and $CaCO_3$, with the transmittance thereof being 80% or greater at a wavelength ranging from 630 to 920 nm. When a glass frit is manufactured using the low expansion glass filler according to an embodiment of the invention, it is possible to minimize the reflection of laser light by the low expansion glass filler during the process of hermetically sealing the space between glass substrates using the laser light, thereby minimizing the loss in the power of the laser light. It is also possible to perform hermetic sealing with low laser power, thereby minimizing damage in a panel due to high laser power during hermetic sealing.

The low expansion glass filler according to an embodiment of the invention can contain, by weight, $SiO_2$ 45 to 65 parts, $Al_2O_3$ 10 to 25 parts, $B_2O_3$ 10 to 20 parts and $CaCO_3$ 10 to 20 parts.

In addition, it is preferred that the coefficient of thermal expansion of the low expansion glass filler according to an embodiment of the invention be $40*10^{-7}/°$ C. or less.

The low coefficient of thermal expansion of the low expansion glass filler can lower the coefficient of thermal expansion of a glass frit into which the low expansion glass filler is mixed, thereby preventing cracks from occurring in a glass substrate due to the difference in the coefficient of thermal expansion between the glass substrate and the glass frit during hermetic sealing of the glass substrate.

Table 1 presents the coefficient of thermal expansion depending on the composition of the low expansion glass filler according to an embodiment of the invention.

TABLE 1

| No. of low expansion glass filler | 1 | 2 | 3 |
|---|---|---|---|
| | | | (unit: wt %) |
| $SiO_2$ | 55.6 | 60.6 | 50.6 |
| $Al_2O_3$ | 15.4 | 12.4 | 18.4 |
| $B_2O_3$ | 16.6 | 14.6 | 18.6 |
| $CaCO_3$ | 12.4 | 12.4 | 12.4 |
| Coefficient of thermal expansion ($*10^{-7}/°$ C.) | 32 | 28 | 39 |

As presented in Table 1, it can be appreciated that the coefficient of thermal expansion of the low expansion glass filler according to the invention is $40*10^{-7}/°$ C.

FIG. 1 is a schematic flowchart showing a method of manufacturing a low expansion glass filler according to an embodiment of the invention.

Referring to FIG. 1, the method of manufacturing a low expansion glass filler according to an embodiment of the invention can include a putting step S100, a melting step S200 and a cooling/crushing step S300.

In order to manufacture the low expansion glass filler, first, at S100, $SiO_2$ 45 to 65 parts by weight, $Al_2O_3$ 10 to 25 parts by weight, $B_2O_3$ 10 to 20 parts by weight and $CaCO_3$ 10 to 20 parts by weight are put into a melting pot. The melting pot can be implemented as a platinum melting pot.

Afterwards, at S200, a mixture of $SiO_2$, $Al_2O_3$, $B_2O_3$ and $CaCO_3$ put in the melting pot are melted by being heated to a temperature of 1600° C. or higher.

Melting can be carried out for about 2 hours or less.

In addition, after the melting, the process of crushing the molten mixture of $SiO_2$, $Al_2O_3$, $B_2O_3$ and $CaCO_3$ using a disk mill can be carried out.

Finally, at S300, the molten mixture is cooled and then crushed, thereby manufacturing a low expansion glass filler.

The crushing process can be carried out by at least one of a ball mill and a jet mill. It is preferred that the molten mixture be crushed such that an average particle diameter is 0.5~2 μm and a maximum particle diameter is 6~10 μm.

The glass frit according to an embodiment of the invention can contain low melting point glass powder and a low expansion glass filler, $SiO_2$, $Al_2O_3$, $B_2O_3$ and $CaCO_3$, with the transmittance of the glass filler being 80% or greater at a wavelength ranging from 630 to 920 nm.

This glass frit can be used for hermetic sealing between glass substrates, and preferably, for the process of hermetically sealing the space between a front glass substrate and a rear glass substrate of an OLED display device.

The low melting point glass powder is a frit powder of the glass frit. It is preferred that the softening point of the low melting point glass powder be 400° C. or below. The low melting point glass powder can be at least one selected from the group consisting of $V_2O_5$—$P_2O_5$ glasses, $V_2O_5$—$P_2O_5$—TeO glasses and $V_2O_5$—$P_2O_5$—$Bi_2O_3$ glasses.

Table 2 presents the softening point and the coefficient of thermal expansion depending on the composition of the low melting point glass powder.

TABLE 2

| No. of composition | 1 | 2 | 3 | 4 |
|---|---|---|---|---|
| | | | | (unit: wt %) |
| $V_2O_5$ | 60.7 | 56 | 49 | 54.6 |
| $P_2O_5$ | 21.1 | 18 | 25 | 20.1 |
| $Sb_2O_3$ | | | | 19.8 |
| ZnO | 7.5 | | | |
| $Bi_2O_3$ | 3.6 | 17 | 17 | |
| $Fe_2O_3$ | 0.9 | 7 | 8 | 4.55 |
| $TeO_2$ | | | | |
| $SiO_2$ | 0.9 | | 1 | 0.95 |
| $BaCO_3$ | | 2 | | |
| $H_3BO_3$ | 5.6 | | | |
| Softening point (° C.) | 276 | 301 | 319 | 325 |
| Coefficient of thermal expansion ($*10^{-7}/°$ C.) | 83 | 85 | 90 | 78 |

As presented in Table 2, it can be appreciated that the low melting point glass has a softening point of 400° C. or below.

The low expansion glass filler contains $SiO_2$, $Al_2O_3$, $B_2O_3$ and $CaCO_3$, and the transmittance thereof is 80% or more at a wavelength ranging from 630 to 920 nm.

It is preferred that the low expansion glass filler contain, by weight, $SiO_2$ 45 to 65 parts, $Al_2O_3$ 10 to 25 parts, $B_2O_3$ 10 to 20 parts and $CaCO_3$ 10 to 20 parts.

In the glass frit according to an embodiment of the invention, it is preferred that the content of the low expansion glass filler range from 10 to 40 weight percent.

This is because it is difficult to adjust the coefficient of thermal expansion of the glass frit to the coefficient of thermal expansion of an object to which the glass frit is to be bonded when the content of the low expansion glass filler is less than 10 weight percent. In contrast, when the content of the low expansion glass filler exceeds 40 weight percent, a hermetic seal is not made since it is difficult to bond the glass frit to the object.

In addition, in the glass frit according to an embodiment of the invention, it is preferred that the average particle diameter of the low expansion glass filler be 0.5~2 μm and the maximum particle diameter of the low expansion glass filler be 6~10 μm.

As described above, the glass frit according to an embodiment of the invention can reduce the reflection of laser light when hermetically sealing the space between glass substrates using the laser light, whereby hermetic sealing can be performed with lower laser power than the related-art laser sealing. It is also possible minimize damage in a panel due to high laser power.

The glass frit according to an embodiment of the invention can further contain a vehicle.

When the vehicle is mixed to the low melting point glass powder and the low expansion glass filler, the glass frit becomes paste-like.

The vehicle can contain ethyl cellulose and butyl carbitol acetate (BCA). The vehicle mixed to the low melting point glass powder and the low expansion glass filler can have a concentration of 10%. It is preferred that the content of the vehicle range 35 to 50% of the total weight of the low melting point glass powder and the low expansion glass filler.

The paste-like glass frit in which the vehicle is mixed is applied on glass substrates by screen printing or the like, is subjected to plasticity processing at about 400° C., and then is heated by laser light, thereby sealing the space between the glass substrates.

Table 3 presents the seal width and the coefficient of thermal expansion depending on the composition of the glass frit according to an embodiment of the invention.

Here, "No. of low melting point glass" and "No. of low expansion glass filler" correspond to "No. of composition" in Table 2 and "No. of low expansion glass" in Table 1. In addition, the low melting point glass powder and the low expansion glass filler were mixed with a vehicle by a weight ratio of 65:35. The vehicle contained ethyl cellulose and butyl carbitol acetate (BCA), and had a concentration of 10%. In addition, a seal width is a value obtained by measuring the width of the glass frit bonded to a glass substrate. Here, the glass frit was bonded to the glass substrate by being applied to a thickness of 500 μm on the glass substrate, plasticity-processed at 400° C., and then heated by laser light.

TABLE 3

| Composition | Ex. 1 | Ex. 2 | Ex. 3 | Ex. 4 |
|---|---|---|---|---|
| No. of low melting point glass | 4 | 4 | 4 | 1 |
| Mixing ratio (wt %) | 85 | 85 | 85 | 85 |
| No. of low expansion glass filler | 1 | 2 | 3 | 2 |
| Mixing ratio (wt %) | 15 | 15 | 15 | 15 |
| Laser power (W) | | 10.5 | | |
| Seal width (μm) | 450 | 450 | 430 | 410 |
| Coefficient of thermal expansion ($*10^{-7}/°$ C.) | 67 | 65 | 75 | 74 |

Referring to Table 3, it can be appreciated that the glass frit according to the invention produced a high seal width of 400 μm or greater under low laser power of about 10 W. This can also be recognized from the pictures of seal widths according to Example 1, Example 3 and Example 4, as shown in FIG. 2. It can also be appreciated that the coefficient of thermal expansion of the glass frit was lowered since the low expansion glass filler having a low coefficient of thermal expansion was mixed into the low melting point glass The foregoing descriptions of specific exemplary embodiments of the present invention have been presented with respect to the drawings. They are not intended to be exhaustive or to limit the invention to the precise forms disclosed, and obviously many modifications and variations are possible for a person having ordinary skill in the art in light of the above teachings.

It is intended therefore that the scope of the invention not be limited to the foregoing embodiments, but be defined by the Claims appended hereto and their equivalents.

What is claimed is:

1. A laser sealing glass frit, comprising:
a mixture comprising a vehicle, a glass powder, and a glass filler having a transmittance of 80% or greater at a wavelength ranging from 630 to 920 nm,
the glass filler being made from a base material composition comprising $SiO_2$, $Al_2O_3$, $B_2O_3$ and $CaCO_3$ by melting, cooling and then crushing the base material composition,
wherein the laser sealing glass frit is adapted for application between first and second glass substrates to form a seal between the first and second substrates.

2. The laser sealing glass frit of claim 1, wherein a content of the glass filler ranges from 10 to 40 weight percent of a mixture of the glass filler with the glass powder prior to addition of the vehicle to form the laser sealing glass frit.

3. The laser sealing glass frit of claim 1, wherein a softening temperature of the glass powder is 400° C. or below.

4. The laser sealing glass frit of claim 1, wherein the glass powder comprises at least one selected from the group consisting of $V_2O_5$—$P_2O_5$ glasses, $V_2O_5$—$P_2O_5$—TeO glasses and $V_2O_5$—$P_2O_5$—$Bi_2O_3$ glasses.

5. The laser sealing glass frit of claim 1, wherein an average particle diameter of the glass powder and the glass filler is 0.5~2 μm and a maximum particle diameter of the glass powder and the glass filler is 6~10 μm.

6. The laser sealing glass frit of claim 1, wherein the base material composition comprises, by weight, $SiO_2$ 45 to 65 parts, $Al_2O_3$ 10 to 25 parts, $B_2O_3$ 10 to 20 parts and $CaCO_3$ 10 to 20 parts.

7. The laser sealing glass frit of claim 1, wherein a content of the vehicle in the laser sealing glass frit ranges from 35 to 50 percent of a combined weight of the glass powder and the glass filler.

8. The laser sealing glass frit of claim 1, wherein the vehicle comprises ethyl cellulose and butyl carbitol acetate.

9. The laser sealing glass frit of claim 1, wherein a coefficient of thermal expansion of the base material composition is $40 * 10^{-7}/°$ C. or less.

* * * * *